United States Patent
Jiang et al.

[11] Patent Number: 5,805,995
[45] Date of Patent: Sep. 8, 1998

[54] CHANNEL RESERVATION AND POWER CONTROL FOR IMPROVED HANDOFF PERFORMANCE

[75] Inventors: Hua Jiang; Jim Xu, both of Plano, Tex.; Sirin Tekinkay, Mahwah, N.J.

[73] Assignee: Northern Telecom Limited, Montreal, Canada

[21] Appl. No.: 739,012

[22] Filed: Oct. 28, 1996

[51] Int. Cl.$^6$ ...................................................... H04Q 7/00
[52] U.S. Cl. ......................... 455/436; 455/439; 455/522
[58] Field of Search .................................. 455/440, 450, 455/62, 524, 525, 522, 436, 437, 438, 439; 320/351

[56] References Cited

U.S. PATENT DOCUMENTS

| | | |
|---|---|---|
| 4,794,635 | 12/1988 | Hess. |
| 4,947,452 | 8/1990 | Hattori et al.. |
| 5,239,676 | 8/1993 | Strawczynski et al.. |
| 5,278,991 | 1/1994 | Ramsdale et al.. |
| 5,448,750 | 9/1995 | Eriksson et al.. |
| 5,574,972 | 11/1996 | Hulbert ................................. 455/436 |
| 5,578,373 | 11/1996 | Jiang ..................................... 455/436 |

FOREIGN PATENT DOCUMENTS

| | | |
|---|---|---|
| 0 472 511 A2 | 8/1991 | European Pat. Off.. |
| 0 490 509 A2 | 11/1991 | European Pat. Off.. |
| 2 242 806 A | 4/1990 | United Kingdom. |

*Primary Examiner*—Reinhard J. Eisenzopf
*Assistant Examiner*—Edan Orgad
*Attorney, Agent, or Firm*—Finnegan, Henderson, Farabow, Garrett & Dunner, L.L.P.

[57] ABSTRACT

A method and system for handing over on-going communications to a target cell including a plurality of low power channels, for handling ongoing calls, and a plurality of higher power channels for handoff. The ongoing call is switched from a low to a higher power channel upon receiving a handoff request. The on-going call is using the higher power channel until a determination is made that the handoff is necessary or unnecessary. The quality of reception of the serving cell and target cell is compared to determine the necessity.

13 Claims, 2 Drawing Sheets

CHANNEL RESERVATION AND POWER CONTROL FOR IMPROVED HANDOFF PERFORMANCE

BACKGROUND OF THE INVENTION

The present invention relates to cellular communication, and more specifically to a method and system of handing off ongoing calls from one cell to another.

Mobile terminals of a cellular communication system may move from the coverage area of a base station, a serving cell, to the coverage area of a neighboring base station, a target cell, while engaged in a call. In this situation, the cellular telephone network detects a reduction in the received signal level at either the base station of the serving cell or, for systems equipped for Mobile Assisted Hand-Off (MAHO), at the mobile terminal. When the received signal strength of the base station of the serving cell indicator (RSSI) is detected below a certain threshold, the network assigns a radio channel in the target cell to the call, and switches the call from the assigned channel in the serving cell to the assigned channel in the target cell, releasing the assigned channel in the serving cell. This operation is known as a handoff.

In one type of handoff, the call is switched from the assigned channel in the serving cell to the assigned channel in the target cell when the target base station and the mobile terminal are establishing a two-way communication path over the assigned channel in the target cell. Usually, the call is switched before the two-way communication path is completed, therefore, a brief interruption occurs in voice communications during a handoff. This interruption degrades the quality of the voice channel as perceived by users of the cellular telephone system.

Another type of handoff, a "soft handoff," is a handoff process where the call does not switch from the assigned radio channel in the serving cell to the assigned radio channel in the target cell until they establish another two-way communication path between the mobile terminal and the target base station over the assigned radio channel in the target cell. Soft handoff reduces the duration of interruption of the communication path during handoff and provides better voice channel quality as perceived by users of the cellular system.

However, soft handoff uses two radio communication channels and two radio hardware channels during the handoff process. This action tends to heavily load the cellular telephone system with mobile traffic and significantly impacts the system's capacity.

Moreover, even though two-way communication is maintained on the assigned channel in the serving cell until two-way communication is established on the assigned channel in the target cell, the quality of the two-way communications on the assigned channel in the serving cell is likely to degrade rapidly and callers may still perceive a reduction in the quality of the voice channel. Moreover, if the assigned channel in the serving cell degrades too rapidly before the handoff can be completed, the call may be dropped altogether.

In some cases, RSSI at the base station or mobile terminal may be reduced temporarily due to fades and other localized conditions, even though the mobile terminal is well within the serving cell. Such temporary conditions may initiate an unnecessary handoff to a target cell. Once such temporary conditions are alleviated, another handoff may be initiated from the target cell back to the previous serving cell. In other cases, a rapid succession of handoffs back and forth between the serving cell and a target cell may be generated when a mobile terminal is located near the periphery of two adjacent cells. Such a rapid succession of handoffs, sometimes called "ping-pong," degrades the perceived quality of the voice channel, while unnecessarily tying up radio channels and generating additional messaging traffic and processing load for the cellular telephone network.

In light of the foregoing, there is a need for a method and system for handing off an on-going communication from a serving cell to a target cell in a cellular communication system which overcomes these disadvantages.

SUMMARY OF THE INVENTION

In accordance with the purpose of the invention, there is provided a method and system for handing off an on-going communication from a serving cell to a target cell in a cellular communication system, which improves the handoff quality, and reduces call drop rate as well as, unnecessary handoffs.

To achieve these and other advantages and in accordance with the purpose of the invention, as embodied and broadly described herein, the present invention is a method of handing off on-going communication from a serving cell to a target cell in a cellular telecommunication network, including the steps of generating a first multiple of communication channels having a first power level at the base station of each of the serving and target cells; generating a second multiple of communication channels, having a second power level higher than the first power level at the base station of each of the serving and target cells; and initiating a handoff request at either the base station of the serving cell or the mobile unit during an on-going communication over one of the first multiple of communication channels of the serving cell, in response to a decrease in the reception quality; switching the on-going communication to one of the second multiple of communication channels in the serving cell having the second power level; continuing the communication over said one of the second multiple of channels having the second power level; and releasing one of the first multiple of channels having the first power level, for a time period sufficient to determine whether the handoff request is necessary or unnecessary; switching the on-going communication from one of the second multiple of communication channels of the serving cell to one of the first multiple of communication channels of the serving cell in response to an unnecessary determination; and switching the on-going communication from one of the multiple of second communication channels of the serving cell to one of the first multiple of communication channels of the target cell in response to a necessary determination.

In another aspect, the invention is a system for handing off an on-going communication from a serving cell to a target cell of a cellular communication network including means for generating at the base station of each of the serving and target cells a first multiple of communication channels having a first power level; means for generating at the base station of each of the serving and target cells a second multiple of communication channels having a second power level higher than the first power level; means for switching the on-going communication to one of the second multiple of communication channels in the serving cell having the second power level in response to a decrease in the quality of reception of one of the first multiple of first channels; means for continuing the on-going communication over one of the second multiple of channels a sufficient length of time to determine whether the handoff is necessary or unnecessary; means for switching the on-going communication from the second communication channel of the serving cell to the first communication channel of the serving cell in response to an unnecessary determination; and means for switching the on-going communication from the second communication channel of the serving cell to the first communication channel of the target cell at times when the determining means determines that the handoff request is necessary.

It should be understood that both the foregoing general description and the following detailed description are exemplary and explanatory and are intended to provide a further explanation of the invention as claimed.

The accompanying drawings are included to provide a further understanding of the invention and are incorporated in and constitute a part of this specification, illustrate one embodiment of the invention and together with the description serve to explain the principles of the invention.

DETAILED DESCRIPTION OF PREFERRED EMBODIMENT

Figure 1:
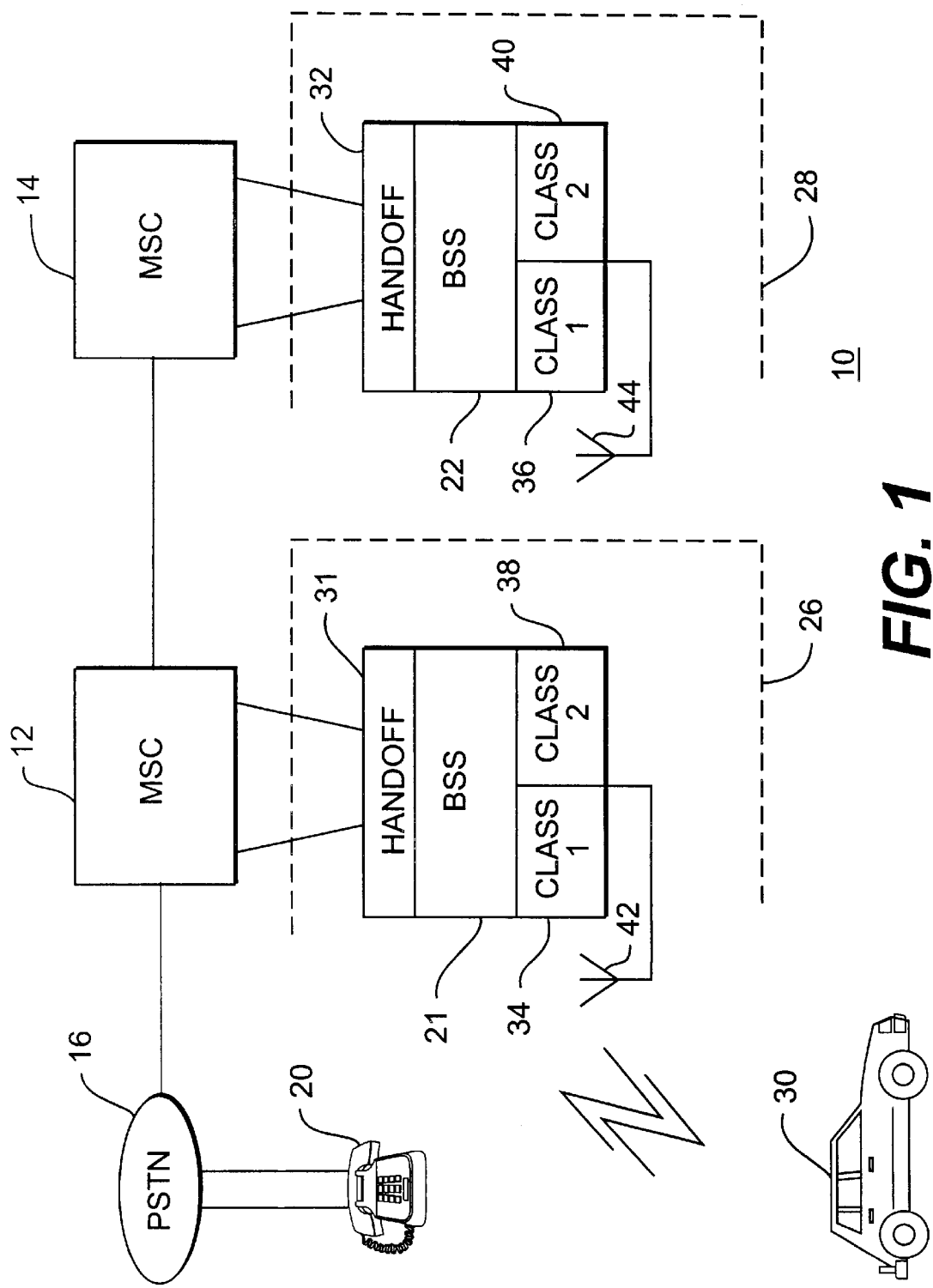
FIG. 1 is a block diagram of a cellular communication system showing one embodiment of the present invention.

Reference will now be made in detail to the present preferred embodiment of the invention, an example of which is illustrated in the accompanying drawings. Referring to FIG. 1, a cellular communication system of the type incorporating the present invention is referred to generally as 10, and contains several base stations having base station subsystems (BSS) 21 and 22. BSSs 21 and 22 are interconnected by one or more mobile switching centers (MSC) 12 and 14. Base station controllers (not shown), which are processors or memory register implemented through circuitry or software, may be located in conjunction with either MSC 12 or 14 or with a particular BSS 21 and 22. Each BSS 21 and 22 provides radio channels that link mobile terminals to a geographic area corresponding to a respective cell defined by dashed lines 26 and 28. MSCs 12 and 14 connect to a public station telephone network (PSTN) 16 to permit connections, and route calls between mobile terminals and landline terminal units connected to PSTN 16. MSCs 12 and 14 also handle mobile to mobile communication by routing calls between BSS. A mobile terminal 30 is located in a cell served by a particular BSS is allocated a radio channel by that BSS, and MSCs 12 and 14 switch the call to the appropriate radio channel. A channel is a set of forward and reverse communication links. It is assumed that there is no difference in coverage between the forward and reverse links. Communication signals are transmitted and received via an antenna array 42 and 44 over an appropriate radio frequency.

In accordance with the present invention, cellular system 10 includes means for generating both a first multiple of communication channels having a maximum power level corresponding to a normal communication channel, and a second multiple of communication channels having a power level that exceeds the unattenuated maximum power level of the first multiple of communication channels, which, at times, effectively extends the periphery of its respective cell.

The first multiple of communication channels, which, at times, are referred to herein as class one channels, are used for normal communication between a mobile terminal and its serving base station. The second multiple of communication channels, which, at times, are referred to as class two channels, are primarily to serve outgoing handoffs. Through power control, the coverage area of class two channels can be adjusted to include a desired percentage of the neighboring cell, this coverage area needs to be optimized with respect to interference considerations and to ensure efficient geographic coverage.

As herein embodied and referring to FIG. 1, each BSS 21 and 22 includes a handoff component 30 and 32, respectively, including means for generating class one channels referred to at 34 and 36, and class two channels, referred to as 38 and 40. The system also includes means for switching an on-going communication to one of the second multiple of communication channels in the serving cell having the second power level in response to a decrease in the received signal strength of the first assigned channel below a threshold value. As herein embodied, handoff components 31 and 32 of BSS 21 and 22 each include a computer program for accomplishing the foregoing function. In accordance with the invention, system 10 also includes means for continuing the on-going communication over the second channel a sufficient length of time to determine whether a handoff is necessary or unnecessary, which in the exemplary embodiment is implemented in the handoff program. In accordance with the present invention the necessity is determined by comparing the reception quality of the serving and target cells. "Reception quality" or the "quality of reception" as used herein is intended to mean any one or more of signal strength to interference, bit error rate, or any other parameter indicative of channel degradation.

In accordance with the present invention, system 10 includes means for switching the on-going communication from one of the second communication channels of the serving cell to one of the first communication channels of the serving cell in response to an unnecessary determination is implemented by software component 30 of the serving cell. Software components 30, of the present invention, also include means for switching the on-going communication from the second communication channel of the serving cell to one of the first communication channels of the target cell at times when the determining means determines that the handoff request is necessary.

The system of the present invention also includes means for determining the availability of class one and class two channels in the serving and target cells. A class two channel is available if there is at least one unallocated channel. The ratio of class two channels to the total number of channels is also subject to optimization with respect to throughput. The allocation of class two channels can be performed dynamically from a pool of class two channels, or at the planning stage, depending on the type of application.

Figure 2:
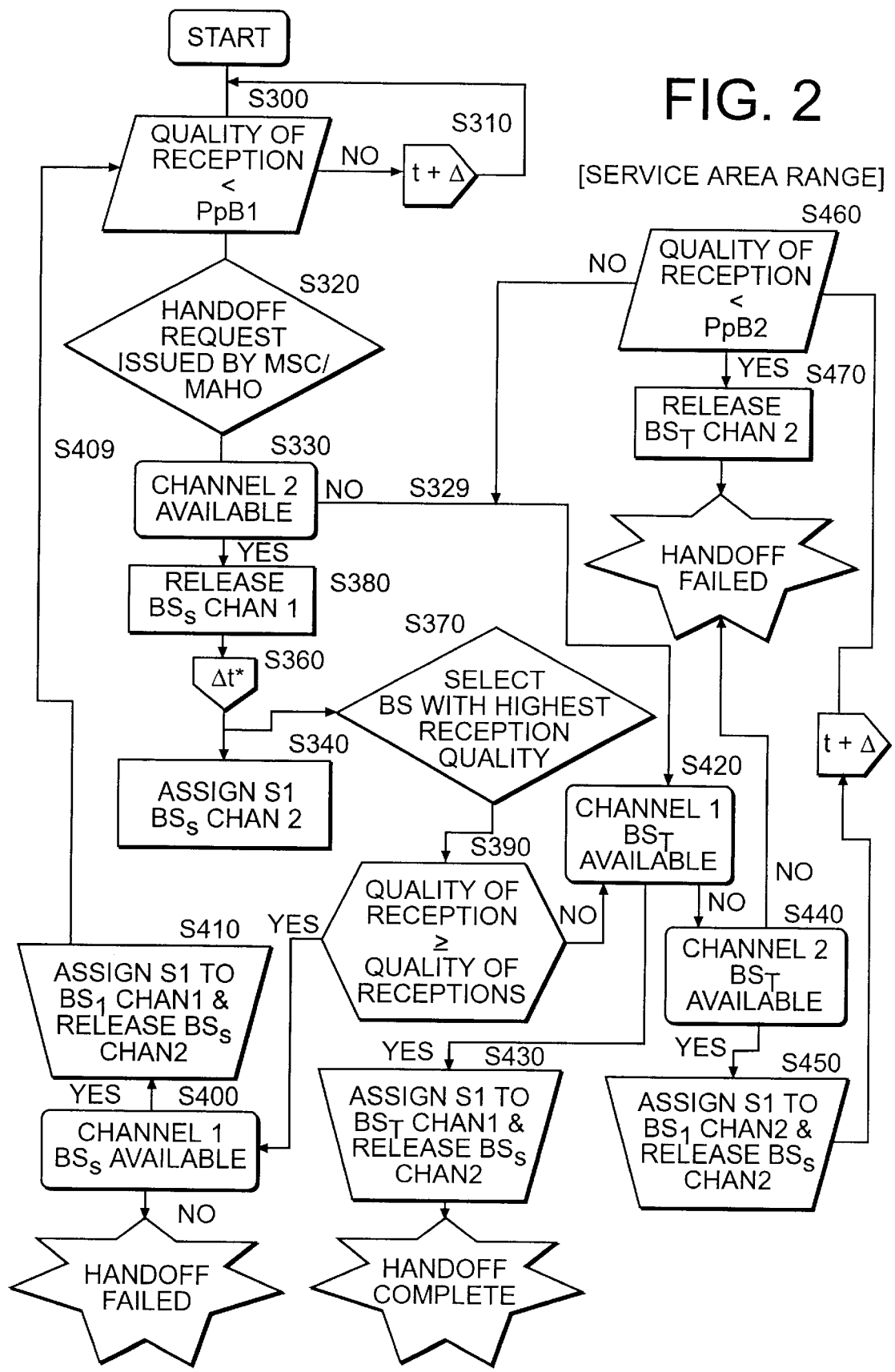
FIG. 2 is a flow chart of the method of handing off an on-going communication in accordance with the system of FIG. 1.

A more detailed description of system 10 and method for handing off an on-going communication from a serving cell to a target cell, will be given in connection with a description of its operation as shown in FIG. 2. For simplicity of explanation, the cell 26 and its associated components are assumed to be the serving cell, and the cell 28 is assumed to be the target cell. Also, in the steps of FIG. 2, a serving cell operation will include the suffix s, and a target cell operation will include the suffix t.

In the method of the present invention, the serving BSS 21 periodically measures the Received Signal Strength Indication (RSSI) on the allocated channel as shown at steps S300 and S310, and when the RSSI falls below a threshold value P, the serving BSS 21 issues a handoff request as indicated at step S320. In a system employing MAHO, mobile terminal 30 also measures RSSI on the allocated channel periodically and issues a handoff request when the RSSI falls below a threshold value. In response to the handoff request, the BSS 21 determines if there is class two channel available at the serving BSS 21 as indicated at step S330. If there is at least one unallocated class two channel in the class two channel queue, the BSS 22 allocates the next available channel in the class two queue to the on-going call, establishes two way communications on the allocated class two channel by connecting the call to the allocated class two channel as indicated at step S340. Then the allocated class one channel is released from the call and thus restores the previously allocated class one channel to the class one queue as shown at S380 after the predetermined time interval, as indicated at step S360.

The class two channel provides good service for a period of time as mobile terminal 30 moves near the cell periphery given its higher operating power. During this waiting period any temporary or localized signal degradations (e.g. due to fades) are cleared, so that it can then be determined whether an inter-cell handoff is really warranted. This will reduce unnecessary inter-cell handoffs and ping-pong, or signal bouncing between cells.

If the cell having the highest quality of reception is the serving cell 26, the detected degradation in quality of reception was likely due to a temporary or localized aberration, and inter-cell handoff is not warranted as indicated at step S390. To free up class two channels for calls requiring inter-cell handoff, the call should be handed back to a class one channel of serving cell 26. The class one channel is selected from the plurality of unallocated class one channels for the serving cell as shown at step S400. A channel from the class one plurality of channels of serving cell 26 is allocated for the transfer, and the signal is assigned to the allocated class one channel, releasing the previously allocated class two channel as indicated at step S410. The call is then awaiting another handoff request as indicated by line S409.

If the cell having the highest quality of reception is not serving cell 26, then BSS 22 for target cell 28 determines the availability of unallocated class 1 channels at step S420. BSS 22 for target cell 28 allocates a class one channel and the signal is assigned to the allocated class one channel at step S430. BSS 21 for the previous serving cell 26 releases the previously allocated class two channel at step S470. If there is no class one channel available in the target cell 28, then BSS 22 for the target cell 28 looks for the availability of unallocated channels at step S440.

If there is a class two channel available in the target cell 28, then BSS 22 for target cell 28 1) allocates a class two channel at S450, 2) connects the signal to the allocated class two channel and BSS 21 for the previous serving cell 26, and 3) restores the previously allocated class two channel, also as indicated at step S450. BSS 22 of target cell 28 continuously monitors the availability of the class one channels at S460, and when a class one channel is released and therefore is unallocated in target cell 28, BSS 22 for the target cell 28 1) allocates that class one channel to the signal, 2) connects the call to the allocated class one channel, and 3) releases the previously allocated class two channel of the target cell as indicated at step S430.

As initially stated, BSS 22 monitors the quality of reception of its cell. If the quality of reception of target cell 23 on the class two channel falls below a certain value, indicating the mobile unit has left the channel's service area, before a class one channel becomes available in target cell 28, the call is dropped by BSS 21 in serving cell 26 and allocated class two channel is released to the class two queue of the serving cell at step S470. If the reception quality of the target cell on the class two channel has not fallen below the threshold level, the mobile unit is considered within the service area of BSS 22, and once a class one channel is released into the class one queue of the target cell as indicated at S420, BSS 22 for the target cell allocates that class one channel to the call and connects the call to the allocated class one channel as indicated at step S430. BSS 22 releases the previously allocated class two channel to the class two queue of the target cell 28 and the handoff is completed at step S430.

In the event a handoff request is issued at step S320 but no class two channel is available at the serving cell as indicated by line S329 from step S330, a handoff is attempted from the allocated class one channel of the serving cell 26 to a class one channel of a target cell 28 as indicated at S420. Again, MSC 12 determines the appropriate target BSS 22 for receiving the signal. MSC 12 selects and screen the appropriate BSS 21 by requesting and receiving the boring cells' reception quality at step S370. Handoff component 31 performs the comparison at step S390, and determines the availability of channel one at S400 and assigns a channel one and releases the channel two as indicated at step S410, as outlined above.

Pursuant to completing the handoff, and assuming BSS 22 of target cell 28 has the highest RSSI, handoff component 32 then determines whether or not there is at least one unallocated channel in its class one channel queue at step S420. If there is, then step S430 is carried out. If there is no channel one available, then step S440 is carried out to determine if a channel two is available.

If a channel two is available, then step S450 is implemented, and the reception quality is compared with the threshold at S460 as previously described. Finally, if it is determined no class two channels are available in the serving cell, at step S330, and neither a class one channel, at step S420, nor a class two channel, at step S440, are available in the target cell 28, the call is dropped. The previously allocated class one channel is then released to the class one queue in BSS 22 of the serving cell 26.

As the discussion surrounding FIGS. 1 and 2 shows, the system and method of the present invention can be deployed for protection of outgoing handoffs, with a number of variations. For instance, new calls could be allowed on class two channels, at lower power levels, if all class one channels are occupied. Further, if there is a new call on a class two channel and a call that is on a class one channel needs to be handed off to another cell, the two channels may be swapped, and the class two channel is used at a higher power level. Similarly, if there is a new call on a class two channel and a class one channel becomes available through the termination of a call, the incoming handoff queue is checked. And if there are queued incoming handoffs on class two channels of their home cells, assignment priority is given to these handoff calls in the class one queue. On the other hand, if there are no such incoming handoffs, the new call on the class two channel is switched back to a class one channel.

In a preferable embodiment, all calls initiated within a cell are allocated a class one channel from the class one queue of that cell. Moreover, if no class one channels are available, call initiation is refused. In an alternate embodiment, a class two channel may be allocated to a call upon initiation if no class one channels are currently available. The alternative embodiment may be enhanced by handing the call initiated on a class two channel over to a class one channel of the same cell when such a channel becomes available. This action allows class two channels to be left open for their intended use. Further, the alternative embodiment may be enhanced by handing the call initiated on a class two channel over to a class one channel on the same cell only when a class one channel is available, and a class two channel is requested for handoff and no class 2 channel is currently available to satisfy the request. Again, this action has the effect of relying on class two channels only when they are needed for their intended use, thereby, minimizing unnecessary intra-cell handoffs. If calls are allocated for handoff, into a cell, when a class one channel becomes available the incoming handoffs should be given priority over calls initiated within the cell for the class one channel.

The foregoing description of a preferred embodiment of the invention has been presented for purposes of illustration and description. It is not intended to be exhaustive or to limit the invention to the precise form disclosed. Further modifications and variations are possible in light of the above teachings or may be acquired from practice of the invention. For example, when class two channels are allocated to mobile terminals moving between cells, operation at higher power levels is appropriate because the mobile terminals are at a maximum distance from the BSSs. However, when class two channels are assigned only because class one channels are not available, operating the class two channels at higher power levels increases interference with adjacent cells without improving channel performance. Consequently, it is advantageous to operate the class two channels at lower power levels under such circumstances.

To solve this dilemma, class two channels could be operated at lower power levels when the BSS is waiting to assign the handoff signal from a class two channel to the first available class one channel of the target cell, as described above in steps S450 and S460. Therefore, when class two channels are operated at low power levels, their power levels could be increased if measured reception quality levels drop below a threshold value.

It will be apparent to those skilled in the art that other modifications and variations can be made in the method and system of the present invention without departing from the spirit or scope of the invention. For example, channel reservation may be performed dynamically or on a fixed basis. Thus, it is intended that the present invention cover the modifications and variations of this invention provided they come within the scope of the appended claims and their equivalents.

What is claimed is:

1. A method of handing off on-going communication from a serving cell to a target cell of a cellular telecommunication network, said method comprising:

generating a first plurality of communication channels having a first power level at a base station of each of the serving and target cells;

generating a second plurality of communication channels having a second power level higher than the first power level at the base station of each of the serving and target cells;

generating a handoff request at either the base station of the serving cell or the mobile unit during an on-going communication over one of the first communication channels of the serving cell in response to a decrease in the quality of reception of one of the first plurality of communication channels;

switching the on-going communication to one of the second plurality of communication channels in the serving cell having the second power level in response to the handoff request; and switching the on-going communication from said one of the second plurality of communication channels of the serving cell to one of the first plurality of communication channels of the target cell.

2. The method of claim 1 further comprising the step of maintaining communication on said one of the second plurality of communication channels for a predetermined length of time to minimize unnecessary handoffs, prior to the step of switching the on-going communication from said one of the second plurality of communication channels to one of the first plurality of communication channels.

3. The method of claim 1, wherein the step of switching the on-going communication to one of the second plurality of communication channels in the serving cell includes the substeps of:

releasing the on-going communication from the first plurality of communication channels after a predetermined time interval; and assigning the on-going communication to one of the first plurality of communication channels.

4. The method of claim 1 further comprising determining at the serving cell whether or not a handoff is unnecessary; and switching the on-going communication from said one of the second plurality of communication channels of the serving cells to one of the first plurality of communication channels of the serving cell at times when a determination is made that the handoff is unnecessary.

5. The method of claim 4, wherein the step of determining whether the handoff request is necessary or unnecessary includes the substeps of requesting and receiving the RSSI from boring cells; and comparing the highest RSSI with the RSSI of the serving cell.

6. The method of claim 4 wherein the step of switching from the second communication channel of the serving cell to the first communication channel of the serving cell, at times when a determination is made that the handoff request is unnecessary, includes the substeps of:

releasing the on-going communication from the assigned second communication channel; and continuing the on-going communication over one of the first plurality of communication channels in the serving cell.

7. The method of claim 1, wherein the step of switching the on-going communication from the second communication channel of the serving cell to the first communication channel of the target cell includes the substeps of:

determining the availability of the first plurality of communication channels in the target cell having the first power level;

assigning the communication to one the first plurality of communication channels in the target cell, if available; and releasing the on-going communication from said one of the second plurality of communication channels in the serving cell at times when none of the plurality of first channels are available in the target cell.

8. A system for handing over an on-going communication from a serving cell to a target cell of a cellular communication network having a plurality of base station subsystems (BSS), the BSS portions comprising:

means for generating a first plurality of communication channels having a first power level at the BSS of each of the serving and target cells;

means for generating a second plurality of communication channels having a second power level higher than the first power level at the BSS of each of the serving and target cells;

means for switching the on-going communication to one of the second plurality of communication channels in the serving cell having the second power level in response to a decrease in the quality of reception of said assigned one of the plurality of first channels;

means for continuing the on-going communication over said one of the plurality of second channels a sufficient length of time to determine whether the handoff is necessary or unnecessary;

means for switching the on-going communication from said one of the plurality of second communication channels of the serving cell to one of the first plurality of communication channels of the serving cell in response to an unnecessary determination; and means for switching the on-going communication from said one of the plurality of second communication channels of the serving cell to said one of the first plurality of communication channels of the target cell at times when the determining means determines that the request is necessary.

9. The system of claim 8 comprising:

means for measuring the quality of reception of the on-going communication;

means for allocating handoff designated communications to the second plurality of communication channels, having the second power level, of the BSS in the serving cell; and means for generating a handoff request during an on-going communication over one of the first plurality of communication channels of the serving cell in response to a decrease in the quality of reception of said one of first communication level.

10. The system of claim 8, wherein the means for switching the on-going communication to one of the second plurality of communication channels in the serving cell includes means for maintaining assignment of the on-going communication to one of the second plurality of communication channels to determine whether or not a handoff is necessary, and means for releasing the on-going communication from the second plurality of communication channels after a predetermined time interval.

11. The system of claim 8, wherein the means for determining whether, or not the handoff request is necessary includes means for requesting and receiving a RSSI from boring cells;

means for measuring the RSSI; and means for comparing the highest RSSI of the boring cells with the RSSI of the serving cell.

12. The system of claim 8, wherein means for switching the on-going communication from said one of the second plurality of communication channels of the serving cell to one of the first plurality of communication channels of the target cell, includes means for determining the availability of any one of the first plurality of communication channels in the target cell;

means for allocating the communication to an available one of the first plurality of communication channels in the target cell;

means for allocating the on-going communication from said one of the second plurality of communication channels of the serving cell to one of the second plurality of communication channels of the target cell when a determination is made that no one of the first plurality of communication channels is available in the target cell; and means for releasing the on-going communication from said one of the second plurality of communication channels of the target cell.

13. The system of claim 8, wherein the means for switching the on-going communication from one of the plurality of the second communication channels of the serving cell to one of the second plurality of communication channels of the target cell, includes means for determining the availability of one of the second plurality of communication channels in the target cell; and means for allocating the on-going communication from said one of the second plurality of communication channels of the serving cell to one of the second plurality of communication channels of the target cell.

* * * * *